Patented Mar. 23, 1943

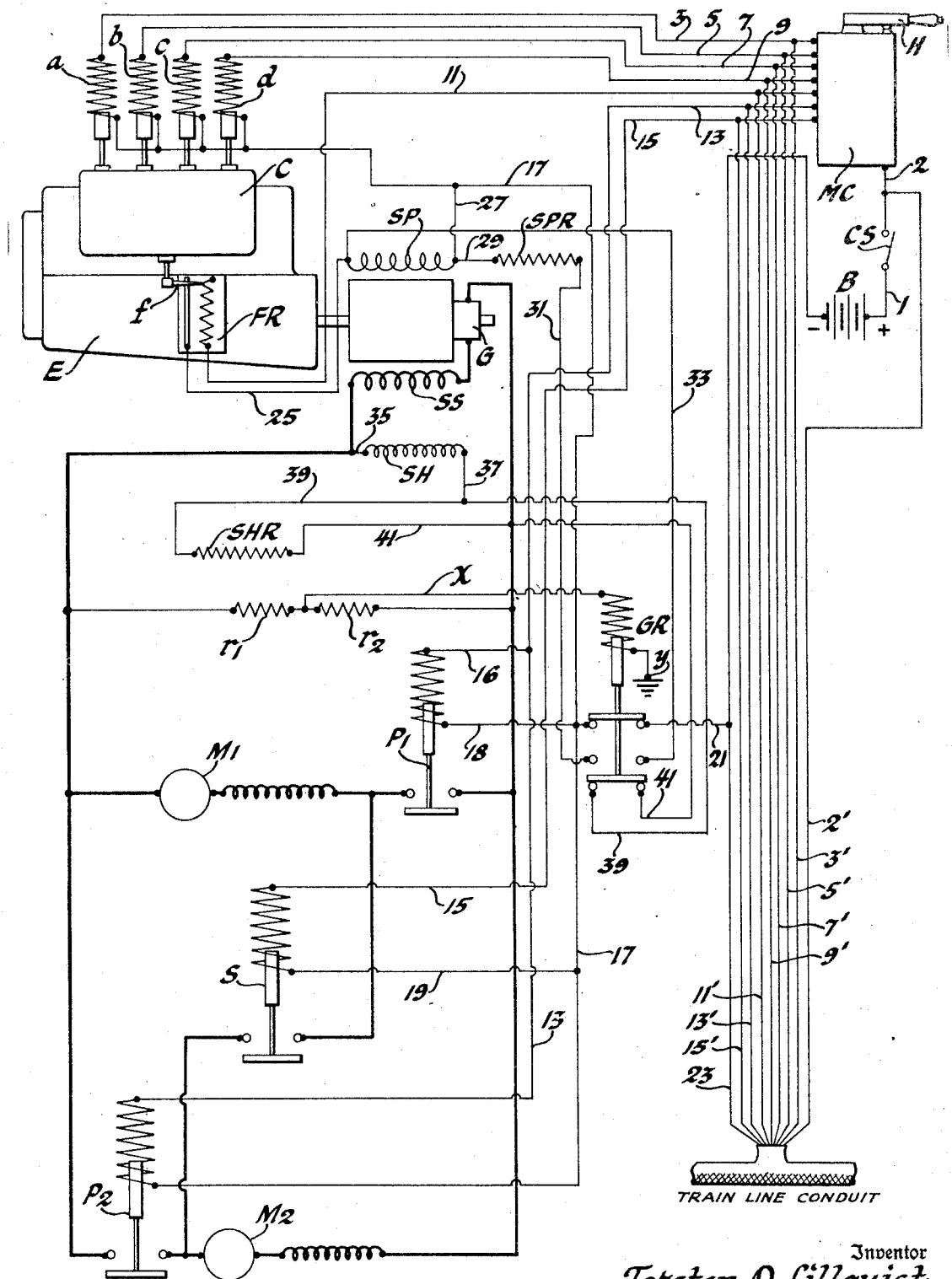

2,314,587

UNITED STATES PATENT OFFICE 2,314,587

GENERATING ELECTRIC DRIVE AND CONTROL SYSTEM

Torsten O. Lillquist, Clarendon Hills, Ill., assignor to General Motors Corporation, Detroit, Mich., a corporation of Delaware Application August 5, 1941, Serial No. 405,528

6 Claims. (Cl. 175—294)

The present invention relates generally to generating electric drive and control systems and more particularly relates to protective means for drive systems of this type.

The usual protective means provided for generating electric drive systems including a prime mover generator power plant supplying power to traction motors comprises means for automatically opening the power circuit between the generator and motors upon overloading thereof or upon a defect occurring in the power circuit causing the circuit to be grounded. With this type of protective means where the power circuit is suddenly opened the power plant continues to operate at high speed and no load until the operator causes the speed to be reduced. On locomotives where a number of generating electric driving systems are controlled and operated in multiple from a single master controller it has been found that when the power circuit of one system is opened by its individual protective means the locomotive engineer cannot readily detect the reduction in speed and power upon opening of one power circuit, especially where one or more driving systems are included on a single locomotive unit and a number of locomotive units and driving systems are coupled together and are operated in multiple. The locomotive maintenance crew may also fail to notice that one of the protective means has operated due to attention to their other duties and because the defective prime mover generator power plant operating at no load is running at the same speed as the power plants and, accordingly, this power plant may continue to operate under these conditions for long periods of time unnoticed, causing damage thereto and excessive fuel consumption by the prime mover.

The principal object of the present invention, therefore, is the provision of simple protective means for a generating electric drive system which acts automatically in response to any leakage of current to ground from the power circuit to simultaneously cause the power circuit to be opened and to cause a reduction in the speed of the prime mover, and also to cause the generator voltage to be reduced, thereby effectively preventing damage to the power plant, motors and power circuit.

The means by which the above object is accomplished is included in the control system of a generating electric drive system such as that used on Diesel electric locomotives and is illustrated in schematic form in the single accompanying drawing and described fully in the following specification.

Referring now to the drawing, the drive system comprises the locomotive traction motors M1 and M2 included in a power circuit, shown in heavy lines, in which are also included motor connecting means S, P1 and P2 or contactors for connecting the motors in different circuit relations with a generator G, the generator being shown directly connected to a prime mover such as a Diesel engine E.

The motor connecting means are shown as electromagnetically actuated contactors, the armatures of each of which are attracted and moved upward into bridging relation with the fixed contacts, shown connected in the power circuit, upon energization of the contactor windings, whereby the motors may be connected in either a series or a parallel circuit relation with the generator in a well known manner. It will be evident with the power circuit arrangement shown, that when the fixed contacts of the contactor S are bridged by the armature contact the motors M1 and M2 will be connected in series with the generator and that when the fixed contacts of both the contactors P1 and P2 are bridged by their respective armature contacts the motors will be connected in parallel with the generator.

The generator excitation system shown includes series and shunt excited field windings shown respectively at SS and SH and a separately excited field winding SP adapted to be connected across a battery B. Discharge resistors SHR and SPR are adapted to be connected respectively to the shunt and separately excited field windings by means to be subsequently described, whereby the excitation current in both of these windings may be reduced to a value such that the generator voltage will be reduced to a negligible value. A field rheostat FR is also included in the separately excited excitation circuit and is provided with a movable element $f$ for varying the resistance thereof and therefor the excitation current in the separately excited winding SP so that the generator output and load on the engine may be varied. The normal combined inherent action of all these generator field windings together with the variation in current in the separately excited winding SP by movement of the element $f$ of the field rheostat FR enables the generator output and the load to be varied in a manner to be described. The connections between the discharge resistors and field rheostat will be described later in describing the control system.

Speed, load and output regulating means shown generally at C are provided for both the generator and engine to cause the engine-generator power plant to operate at any one of a number of constant values of speed, load and output. This regulating means may comprise any well known type of governor driven by the prime mover having conventional governor speed and load setting means whereby the conventional governor sleeve is caused to act in response to variations in the speed and load on the prime mover to adjust the conventional engine fuel regulating device, not shown, and vary the engine speed and torque. The governor sleeve may also act to adjust the movable element $f$ of the field rheostat FR to vary the load on the engine in such a manner that the engine operates at substantially constant speed and horsepower output for any particular governor speed setting.

Electromagnetic means shown at $a$, $b$, $c$ and $d$ are provided for controlling the speed, load, and output regulating means C. Each of these electromagnetic means comprises an electromagnetic winding and a plunger. The plungers may be operatively connected to the governor setting means, not shown, in any well known manner whereby when the electromagnetic means $a$, $b$, $c$ and $d$ are de-energized, the governor setting means will be adjusted by the plungers so that the power plant will operate at idle speed and no load and output, and when the means $a$, $b$, $c$ and $d$ are energized separately or in various combinations the governor setting means will be adjusted to different positions to cause the power plant to operate at different higher values of speed, load and output under control of the governor.

A master controller MC and protective means shown as the relay GR control energization and de-energization of the electromagnetic control means and the electromagnetic motor connnecting means, and energization and de-energization of the separately excited generator field circuit is also controlled by the controller and relay. The relay also serves to control the connection of the discharge resistors SHR and SPR in the generator excitation circuits to cause a reduction in the generator voltage.

The protective means or relay GR includes an actuating winding, three pairs of fixed contacts and an armature having contacts fixed thereto which are movable into and out of contact with the fixed contacts upon energization and de-energization of the relay winding. When the relay is inoperative, that is, with the winding de-energized, the contact arrangement is such that the armature contacts are in bridging relation with the upper and lower pairs of fixed contacts, as shown. When the relay is operative, that is, when the winding is energized, the armature is attracted and moved upward so that the armature contacts move out of bridging relation with the upper and lower fixed contacts and the lower armature contact moves into bridging relation with the central pair of fixed contacts. The relay winding is connected in equipotential relation between ground and all parts of the power circuit in the following manner: Two resistances $r1$ and $r2$ of equal value are connected in series across the power circuit as shown. One terminal of the relay winding is connected by a conductor X to a point between the resistances and the other terminal is connected to ground at point Y. With the relay winding connected in this manner any leakage of current to ground from any part of the power circuit flows through the relay winding to cause energization thereof and upward movement of the relay armature from the normal position, shown, to the operative position where the central pair of fixed relay contacts are bridged by the lower armature contact. Current leakage due to grounds in any part of the power circuit or flashover of the generator or motors to ground will, therefore, cause the relay to operate.

The master controller MC is of the conventional sequence drum type having a number of stationary contacts and a movable contact, not shown. The movable contact is movable by a controller handle H into contact with the stationary contacts in different sequences and combinations in the usual manner. The positive post of the battery is shown connected by a conductor 1 to one terminal of a control switch CS, and the other terminal of this switch is connected by a conductor 2 to the movable controller contact in any convenient manner. Control conductors 3, 5, 7, 9, 11, 13 and 15 are connected to the stationary controller contacts. Conductors 3, 5, 7 and 9 are also connected, respectively, to the upper terminals of the windings of the electromagnetic means $a$, $b$, $c$ and $d$. Conductor 11 is also connected to one terminal of the field rheostat FR. Conductor 13 is also connected to the upper terminal of the winding of the parallel contactor P2 and a jumper conductor 16 connects the upper terminal of the winding of parallel contactor P1 to the conductor 13. Conductor 15 is also connected to the upper terminal of the winding of the series contactor S. The lower terminals of each of the windings of the electromagnetic means $a$, $b$, $c$ and $d$ and contactor P2 are connected by a conductor 17, and the lower terminals of the windings of contactors P1 and S are connected by jumper conductors 18 and 19, respectively, to the conductor 17. The conductor 18 is also connected to the upper left fixed relay contact, and the upper right relay contact is connected by a conductor 21 to a train line conductor 23 shown connected to the negative battery terminal. The conductor 23 serves as a negative train line conductor and is shown extending into a train line conduit. The other terminal of the field rheostat FR is connected by a conductor 25 to one terminal of the separately excited field winding SP and the other terminal of this winding is also connected to the conductor 17 by a jumper conductor 27. Individual train line conductors 2', 3', 5', 7', 9', 11', 13', and 15' are connected, respectively, to the control conductors 2, 3, 5, 7, 9, 11, 13, and 15. All of these train line conductors are shown entering the train line conduit in the drawing and when connected in multiple with other similar conductors enable the batteries, master controllers and electromagnetic control and motor connecting means and also the separately excited field windings of other similar drive systems to be connected for multiple control from any master controller in conventional manner.

It will be noticed that one terminal of the separately excited field winding SP is connected by a conductor 29 to one terminal of the discharge resistor SPR, and the other terminal of this resistor is connected by a conductor 31 to one of the fixed central relay contacts, the other central contact being connected by a conductor 33 to the other terminal of this field winding. As these central contacts are normally open, as shown, with the relay inoperative, the discharge resistor is normally placed in open circuit relation with this field winding, but upon operation of the relay these contacts are bridged which accordingly connects the discharge resistor across the field winding.

One terminal of the shunt field winding SH is connected to one terminal of the series field winding SS by a conductor 35, and the other terminal of the shunt field winding is connected by a conductor 37 to a conductor 39 connecting one terminal of the discharge resistor SHR to one of the lower fixed contacts of the relay. The opposite terminal of the resistor and the other lower relay contact are both connected to the other side of the power circuit by the conductor 41. As the lower relay contacts are normally bridged as shown, with the relay inoperative, the shunt discharge resistor is shunted, but upon operation of the relay the discharge resistor is inserted in series relation with the shunt field winding.

With the above described connection arrangement it will be evident that with the relay GR inoperative, that is, with the upper pair of fixed relay contacts bridged as shown, one terminal of the windings of each of the electromagnetic means $a$, $b$, $c$, $d$, S, P1 and P2 and also one terminal of the separately excited field winding SP will be connected to the negative battery terminal through the jumper conductors 18, 19, conductor 17, and negative train line conductor 23, and accordingly any combination of the above mentioned windings may be energized depending upon which control conductors are connected to the positive battery terminal through the controller contacts and conductors 1 and 2, which are connected when the control switch CS is closed. It will be evident, therefore, that by movement of the controller handle H to various control positions any desired combination of the windings $a$, $b$, $c$ and $d$ may be energized to cause the governor setting means to be set so that any desired value of speed, load and output of the engine and generator power plant may be obtained above that corresponding to the low values obtained at idling speed, and either the winding of the series contactor S or both windings of the parallel contactors P1 and P2 may also be energized in any desired sequence depending upon the controller position to cause the motors M1 and M2 to be connected in either a series or parallel relation with the generator G in a normal conventional manner as long as the relay GR is inoperative.

Automatic operation of the relay GR in response to leakage of current to ground from any part of the power circuit, due to its being connected in equipotential relation with all parts of the circuit with respect to ground, causes the armature of the relay to be attracted and moved upward to the operative position so that the lower and upper pairs of fixed relay contacts are opened and the central pair of fixed contacts are bridged.

Opening of the upper pair of relay contacts opens the common negative return circuit of the windings of the electromagnetic means $a$, $b$, $c$, $d$, S, P1 and P2 and also the separately excited generator field circuit. De-energization of the windings of the electromagnet means $a$, $b$, $c$ and $d$ causes the power plant speed, load and output to be reduced to a low value. De-energization of either the series or parallel contactor windings S, P1 and P2 respectively causes the motors M1 and M2 to be disconnected from the generator. De-energization of the separately excited field winding causes a drastic reduction in the generator voltage and output.

Bridging of the central pair of fixed relay contacts by the lower armature contact causes the discharge resistor SPR to be connected across the separately excited field winding to prevent an increase in the induced voltage upon the opening of this circuit as described above.

Opening of the lower relay contacts causes the discharge resistor SHR to be inserted in series with the shunt field winding to reduce the current therein, causing a further reduction in the generator voltage and output which, together with the drastic reduction in voltage and output caused by the opening of the separately excited field winding, causes the generator voltage and output to be reduced to a negligible value.

With the protective means or relay GR arranged in the control and power circuits of a generating electric drive and control system in the manner described the engine, generator, motors and power circuit are effectively protected against damage resulting from leakage of current to ground from any part of the power circuit.

It will be evident that protective means acting in response to overloading of the generator or motors may be substituted for the protective means described to provide similar protection for the driving system if desired. Also, if desired, the lower terminals of the windings of the contactors S, P1 and P2 may be directly connected to the negative train line control conductor 23 rather than as shown, as the speed and output of the engine and generator to the motors are reduced to a valve such that the motors, when connected with the generator, are rendered ineffective in driving the vehicle; however, a slight voltage will be impressed thereon if these contactor windings are connected directly to the negative control conductor 23.

I claim:

1. In a drive and control system for a vehicle comprising a prime mover generator power plant, means for varying the speed and output of the power plant between low and high values, traction motors for driving the vehicle, a power circuit including means for connecting the motors to the power plant generator, electrical protective means connected with the power circuit for energization only by leakage of current therefrom to ground, and control means operable by said electrical means only upon energization thereof for rendering the power plant speed and output varying means inoperative to cause the speed and output of the power plant to be reduced to a low value whereby the motors are rendered ineffective for driving the vehicle.

2. In a drive and control system for a vehicle comprising a prime mover generator power plant, means for varying the speed of the prime mover to values above idle speed, traction motors for driving the vehicle, a power circuit including means for connecting the motors with the generator, grounded electrical means connected with the power circuit for energization only by leakage of current therefrom to ground, control means operable by said electrical means only upon energization thereof for rendering said prime mover speed varying means and said motor connecting means inoperative thereby to cause the speed of the prime mover to be reduced to a low value and the motors to be disconnected from the generator, and manually operable control means connected with said first named control means for normally controlling both said prime mover speed varying means and said motor connecting means only when said first named control means is inoperative.

3. In a drive and control system for a vehicle comprising a prime mover generator power plant, means for varying the speed, load and output of the power plant between low and high values, traction motors for driving the vehicle, a power circuit including means for connecting the motors in different circuit relations with the generator, electrical means connected between ground and the power circuit for energization only by leakage of current to ground from the circuit, control means operable by the electrical means only upon energization thereof for rendering said power plant speed, load and output varying means and said motor connecting means inoperative in order to cause the speed, load and output of the prime mover to be reduced to a low value and thereby to cause the motors to be rendered ineffective for driving the vehicle, and manually operable means interconnected with said first named control means for normally controlling both the prime mover speed, load and output varying means and said motor connecting means only when said first named control means is inoperative.

4. In a drive and control system for a vehicle comprising a prime mover generator power plant, a governor driven by the prime mover for regulating the speed and torque of the prime mover between low and high values, generator excitation varying means operable by the governor for varying the generator output to vary the load on the prime mover, governor speed setting means, traction motors for driving the vehicle, a power circuit including means for connecting the motors in different relations with the generator, electrical means connected in equipotential relation with all parts of the power circuit with respect to ground for energization by leakage of current from any part of the circuit, control means operable by said electrical means only upon energization thereof for rendering the governor speed setting means and the motor connecting means inoperative to cause the speed, load and output of the prime mover to be reduced to a low value and to cause the traction motors to be disconnected from the generator, and a manually operable master controller interconnected with the first named control means for normally controlling both said governor speed setting means and said motor connecting means only when said first named control means is inoperative.

5. In a drive and control system for a vehicle comprising a prime mover, a governor driven by the prime mover for regulating the speed and torque of the prime mover, governor speed setting means, a generator driven by the prime mover having an excitation system including excitation varying means operable by the governor to vary the generator output and the load on the prime mover, means for limiting the generator excitation to a low value to reduce the generator voltage and output to a negligible value, traction motors for driving the vehicle, a power circuit including means for connecting the motors with the generator and protective means including electrical means connected between the power circuit and ground for energization only upon leakage of current from the power circuit to ground, control means operable by said electrical means only upon energization thereof for simultaneously rendering the governor speed setting means and motor connecting means inoperative and for controlling the generator excitation limiting means, thereby to cause the prime mover speed and torque, load and output to be reduced to a low value and to cause the generator voltage and output to be reduced to a negligible value and also to cause the motors to be disconnected from the generator, and a manually operable controller interconnected with said first named control means for normally controlling both said governor setting means and said motor connecting means only when said first named control means is inoperative.

6. In a drive and control system for a vehicle comprising a prime mover generator power plant, a governor driven by the prime mover for regulating the speed and torque thereof, generator excitation varying means operable by the governor for regulating the load on the prime mover, governor speed setting means, electrical means for controlling the governor speed setting means to cause operation of the power plant at high values of speed, torque, load and output, vehicle traction motors for driving the vehicle, a power circuit including means for connecting the motors in different circuit relations with the generator, electrical means for actuating said motor connecting means, protective means comprising current responsive means connected between ground and the power circuit for energization by any leakage of current to ground from the power system, control means operated by said current responsive means for controlling de-energization of said electrical means controlling the governor setting means to cause a reduction in the speed, torque, load and output of the power plant thereby rendering the motors ineffective for driving the vehicle, and a manually operable master controller connected with said first named control means for normally controlling energization of both the above mentioned electrical means when said protective means is inoperative, said controller adapted to be connected in multiple with other electrical means and current responsive means to control energization of these other electrical means in like manner.

TORSTEN O. LILLQUIST.